United States Patent
Mende et al.

(10) Patent No.: US 8,641,563 B2
(45) Date of Patent: Feb. 4, 2014

(54) BELT PULLEY DAMPER

(75) Inventors: Hartmut Mende, Bühl (DE); Jürgen Kroll, Bühl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 243 days.

(21) Appl. No.: 13/066,453

(22) Filed: Apr. 14, 2011

(65) Prior Publication Data
US 2011/0263365 A1 Oct. 27, 2011

Related U.S. Application Data (60) Provisional application No. 61/324,001, filed on Apr. 14, 2010.

(51) Int. Cl.
*F16H 55/36* (2006.01)

(52) U.S. Cl.
USPC .......................................... 474/94; 464/67.1

(58) Field of Classification Search
USPC ................. 464/38, 39; 192/46, 69.81; 474/94
See application file for complete search history.

(56) References Cited

U.S. PATENT DOCUMENTS 4,384,858 A * 5/1983 Kronert et al. ................... 464/56
6,352,243 B1 * 3/2002 Samejima ...................... 254/352

FOREIGN PATENT DOCUMENTS

JP 10252857 A * 9/1998

OTHER PUBLICATIONS

English Machine Translation of JP 10252857 A.*

* cited by examiner

*Primary Examiner* — William E Dondero
*Assistant Examiner* — Diem Tran
(74) *Attorney, Agent, or Firm* — Alfred J. Mangels (57) ABSTRACT

A belt pulley damper for attenuating torsional vibrations of a drive shaft and includes a belt pulley for driving a pull mechanism, particularly a pulling belt. A torsional vibration damper, particularly a decoupler for torsional vibrations is connected with a drive flange and includes a driven disk movable circumferentially relative to the drive flange, and a driven disk is axially movable relative to a belt pulley. The belt pulley and the driven disk include axially-opposed teeth. The belt pulley teeth and the driven disk teeth can be engaged below a threshold pull force occurring during drive operation, and can be disengaged above the threshold pull force. In that manner, undesired torsional vibrations can be avoided by a free-wheel device without substantially increasing noise.

12 Claims, 6 Drawing Sheets

BELT PULLEY DAMPER

BACKGROUND OF THE INVENTION

1. Field of the Invention

The present invention relates to a belt pulley damper by means of which torsional vibrations of a drive shaft can be attenuated to drive a belt pulley with a small magnitude of torsional vibration. The belt pulley damper can be connected with a motor vehicle crankshaft, particularly to drive, for example, a generator/alternator of the motor vehicle using the belt pulley.

2. Description of the Related Art

DE 10 2009 004 713 A1 discloses a belt pulley damper that includes a drive flange connectable with a drive shaft. A torsional vibration damper is connected with the drive flange via a freewheel device that again is directly connected with a belt pulley. The freewheel device disposed between the drive flange and the torsional vibration damper in the power flow direction includes ramps that are bent out of a base plane, by which a free-wheel device is provided in the form of a ratchet mechanism. In coasting operation, a driven disk of the freewheel device can slide on the chamfered flanks of the bent-out ramp, and thereby the driven disk is shifted axially without transmitting torque from the drive flange to the driven disk. In drive operation, the driven disk can come in contact on the rear side of the bent-out ramp and transmit torque.

There is constant need to develop belt pulley dampers so that undesired torsional vibration can be avoided while keeping noise emission as low as possible.

An object of the present invention is to provide a belt pulley damper by which undesired torsional vibration is avoided while keeping noise emission low.

SUMMARY OF THE INVENTION

The object is achieved by a belt pulley damper—according to the invention—for attenuating torsional vibrations of a drive shaft and includes a belt pulley for driving a pulling mechanism, particularly a pulling belt. Furthermore, the belt pulley damper includes a drive flange connectable non-rotatably with the drive shaft. Furthermore, a torsional vibration damper is connected with the drive flange, particularly a decoupler for torsional vibrations, whereby the torsional vibration damper includes a driven disk that is movable in a circumferential direction relative to the drive flange, and the driven disk is designed to be axially movable relative to the belt pulley. The belt pulley includes at least a belt pulley tooth pointing in the axial direction toward the driven disk. The driven disk includes at least a driven tooth pointing in the axial direction toward the belt pulley. The belt pulley tooth and the driven tooth are formed such that the belt pulley tooth and the driven tooth are engaged below a threshold pull force possibly occurring during the drive operation, and are disengaged above the threshold pull force, and/or the belt pulley tooth and the driven tooth are engaged below a threshold push possibly occurring during coasting operation and are disengaged above the threshold push.

Owing to the formation of at least one belt pulley tooth and at least one driven tooth, a sufficiently high frictional force can be provided between the belt pulley tooth and the driven tooth during drive operation, and/or during coasting operation below the corresponding threshold value so that torque transmission is possible. Above the corresponding threshold value, the frictional force possibly occurring between the belt pulley tooth and the driven tooth can be overcome so that the belt pulley tooth can slide off relative to the driven tooth and shift the driven disk axially. Through the tooth-shaped design, both during drive operation and coasting operation, a tooth flank can be formed enabling torque transmission below the respective threshold value, and to form the freewheel effect above the corresponding threshold value. The driven disk of the torsional vibration damper and the belt pulley thereby form a freewheel device, which, depending upon the design of the teeth provided, provide freewheel effect upon reaching a certain threshold power, only in drive operation, or only in coasting operation, or both in drive operation and coasting operation. The respective tooth can be rounded particularly in the transition area between the respective tooth flank and the tooth head, and/or be chamfered so that respective teeth are prevented from knocking one another above the respective threshold value. Therefore, through a simple design measure, it is possible to reduce the noise emission significantly above the respective threshold value. Furthermore, the engagement of teeth of the belt pulley with the driven disk in the power flow direction occurs downstream of the torsional vibration damper. Through this, the vibrations in the circumferential direction can be attenuated by the torsional vibration damper, so that the belt pulley and the driven disk are subjected to significantly less sudden speed variations in the circumferential direction. That allows the noise emission to be reduced further. Through possible freewheel effect during coasting operation, it can be avoided that the drive shaft, particularly a crankshaft of a motor vehicle, is braked. Through possible freewheel effect during drive operation, overload protection is provided, which protects the ancillary components that are driven by the belt pulley against damage caused by too high-energy drive.

Under drive operation, an operating state is to be understood in which the power flows from the drive shaft, or from a drive hub connected with the drive shaft, to the belt pulley in order to transmit, for example, the torque provided by a combustion engine of a motor vehicle to the belt pulley, and from there via a pulling belt to an ancillary component. Under coasting operation, an operating state is to be understood in which no torque is transmitted from the drive shaft, and owing to the moments of inertia of the ancillary components driven by the belt pulley, power can flow from the belt pulley toward the drive shaft if no freewheel effect were provided during coasting operation.

It is also possible to provide the freewheel device formed by the belt pulley tooth and the driven tooth in the power flow direction, between the drive shaft, or a drive hub connected with the drive shaft, and the torsional vibration damper. The respective teeth of the freewheel device can be formed in this case, for example, by a drive disk of the torsional vibration damper, and the drive hub or the drive flange connected particularly with the drive hub.

Preferably, a spring force is applied to the driven disk by means of a spring element in the axial direction, toward the belt pulley. It can be ensured through the spring force that for particularly low torque values the belt pulley is engaged with the driven disk. Particularly, a minimum frictional force can be provided between the belt pulley tooth and the driven tooth. The magnitude of the normal force acting between the belt pulley tooth and the driven tooth can be adjusted as defined by the spring element, so that with knowledge of the acting spring force the geometry of the belt pulley tooth and the driven tooth can be selected accordingly. Particularly preferred, the acting spring force is adjustable by means of an adjusting device. For example, the spring travel provided for the spring element can be shortened and/or lengthened by means of a screw so that the acting spring force can be adjusted to be harder or softer.

Particularly, the torsional vibration damper includes a drive disk connected non-rotatably with the drive flange, whereby the spring element supports the drive disk, or the spring element is guided through the drive disk and supported on the drive flange. A spring element with a comparatively small axial extension, for example a diaphragm spring or a Belleville (wave ring) can be disposed between the drive disk and the driven disk of the torsional vibration damper. In a spring element with a larger axial extension, for instance a coil spring, the spring element can be disposed between the drive flange and the driven flange, whereby the spring element can be guided through the drive disk. The drive disk can include, for example, a gap through which a coil spring can be stuck, in order for it to be supported on the drive flange. Herewith, the insight is exploited in that the drive disk is connected non-rotatably with the drive flange, and it exercises no relative movement toward the drive flange. The spring element in that case is not restricted by the axial extension of the drive disks in its axial space.

Particularly preferred is a plurality of spring elements disposed and distributed on the circumference in the circumferential direction, and/or the spring element is disposed essentially coaxially to the torsional vibration damper. For example, a wave ring, a diaphragm spring or a coil spring with a correspondingly large internal diameter can be disposed coaxially to the torsional vibration damper. The assembly of the belt pulley damper is thus simplified. Furthermore, it is possible to dispose a plurality of spring elements, for example coil springs with a comparatively small diameter, in the circumferential direction, distributed in the torsional vibration damper. Through the number of spring elements, the spring force can be adjusted correspondingly larger or smaller without enlarging the required space.

Preferably, the belt pulley tooth includes a belt pull flank that is effective during drive operation and a belt push flank that is effective during coasting operation, whereby the belt pull flank features a belt pull angle $\alpha_R$ to a plane extending along the tooth height, and the belt push flank features a belt push angle $\beta_R$ to a plane extending along the tooth height, whereby the belt pull angle $\alpha_R$ is smaller than the belt push angle $\beta_R$, and/or the driven tooth includes a driven pull flank acting during drive operation and a driven push flank acting during coasting operation, whereby the driven pull flank features a driven pull angle $\alpha_A$ to a plane along the tooth height, and the driven push flank features a driven push angle $\beta_A$ to the plane along the tooth height, whereby the driven pull angle $\alpha_A$ is smaller than the driven push angle $\beta_A$. Particularly, it applies for the belt pull angle $\alpha_R$ that $0°<\alpha_R\leq30°$ and for the driven pull angle $\alpha_A$ that $0°<\alpha_A\leq30°$, and/or for the belt push angle $\beta_R$ that $65°\leq\beta_R<90°$, and for the driven push angle $\beta_R$ that $65°\leq\beta_A<90°$. Since the corresponding pull angle is smaller than the corresponding push angle, it can be ensured that during coasting operation for significantly small torque, the free-wheel function is more effective than during drive operation. Due to the significantly asymmetrical formation of the cross-section of the respective tooth, correspondingly and significantly different threshold values can be realized for the drive and the coasting operation. The corresponding angles can be adapted particularly in dependence upon the material pairing between the belt pulley tooth and the driven tooth, and/or the normal force possibly occurring between the belt pulley tooth and the driven tooth.

Particularly, the belt-pull flank and/or the belt push flank and/or the driven pull flank and/or the driven push flank are preferably bent in the radial direction. That allows a helical tooth system to be formed between the belt pulley and the driven disk. Particularly for different curvature radii, and/or when only the driven tooth or only the belt pulley tooth is bent in the radial direction, an essentially dot-shaped or line-shaped contact can be formed between the belt pulley tooth and the driven tooth. Owing to the lack of surface contact between the belt pulley tooth and the driven tooth, noise emission can be reduced further in case of an axial displacement of the driven disk.

Particularly, the belt pulley tooth is provided with a softer outer material on an outer part pointing toward the driven disk, in comparison with the inner material under it, and/or the driven tooth is provided with a softer outer material in comparison with an inner material under it. The belt pulley and/or the driven disk can be formed particularly as a composite material. Through the softer material in the contact section between the belt pulley tooth and the driven tooth, additional damping can be attained, through which further reduction of noise emission can be achieved. For instance, the outer material can be made of a plastic and/or the inner material can be made of a metallic material, particularly steel, or a hard plastic. For example, the inner material of the belt pulley or of the driven disk with the respective teeth can be submerged in an essentially liquid plastic, whereby, the plastic can subsequently cure and harden. Complete submersion is not required, so that the belt pulley or the driven disk can be submerged with a tool partially briefly and easily in the essentially liquid plastic.

Preferably, the torsional vibration damper is received by the belt disk with more than 50%, particularly more than 70%, and preferably more than 90%, of its axial extension from the belt pulley. The belt pulley can be formed in this case particularly essentially pot-shaped, so that the torsional vibration damper can be pushed in fully or partially from one face side of the belt pulley. Herewith, the insight is exploited that the belt pulley includes a comparatively large extension in order to drive a pulling belt, which can be formed as a flat belt or as V-belt, in a frictionally-engaged manner. The axial space requirement of the belt pulley damper is not increased, or not increased substantially, by the torsional vibration damper, and the tooth between the belt disk and the driven disk. Particularly preferred, the essentially pot-shaped belt pulley can be essentially covered by the drive flange, whereby a possibly narrow gap remains between the drive flange and the belt pulley in order to avoid a grinding effect during relative movement between the drive flange and the belt pulley.

The invention furthermore relates to a belt pulley damper for attenuating torsional vibrations of a drive shaft, with a belt pulley for driving a pulling means, particularly a pulling belt, and a drive flange non-rotatably connectable with the drive shaft. A torsional vibration damper, particularly a decoupler for torsional vibrations, is connected with the drive flange, whereby the torsional vibration damper includes a drive disk and a driven disk movable in the circumferential direction relative to the drive disk. The drive disk is disposed axially movable relative to the drive flange. The drive flange includes at least a flange tooth facing toward the drive disk in the axial direction. The drive disk includes at least a drive tooth in the axial direction facing toward the drive flange. The flange tooth and the drive tooth are formed such that both the flange tooth and the drive tooth are engaged under a threshold pull force, possibly occurring during drive operation, and are disengaged above the threshold pull force, and the flange tooth and the drive tooth are engaged under a threshold push force possibly occurring during coasting operation and are disengaged above the threshold push force. Through that arrangement, undesired torque transmission can be avoided both in drive operation and in coasting operation without the noise emission being increased significantly. In comparison with the above-described belt pulley damper, the freewheel device is not formed by the driven disk and the belt pulley, but rather by the drive flange and the drive disk. The freewheel device is therewith shifted in the power flow direction between the drive shaft, or a drive hub connectable with the drive shaft, and the torsional vibration damper. The belt pulley damper can be formed and developed further as described above, whereby the embodiments for freewheel function apply correspondingly for the drive flange and drive disk. All the above explanations about the driven disk and the driven tooth of the above-described embodiment apply correspondingly to the drive flange and the flange tooth of this embodiment. All the above explanations about the belt pulley and the belt pulley tooth of the above-described embodiment apply correspondingly to the drive disk and the drive tooth of this embodiment. In addition, the explanations about the spring element of the above-described embodiment apply correspondingly to this embodiment, to pressurize the drive disk by means of a corresponding spring element with a spring force.

It is particularly preferred if the driven tooth and/or the drive tooth is an integral component of the torsional vibration damper. The driven tooth and/or the drive tooth can be formed by a functional component of the torsional vibration damper, without it being required to form the driven tooth and/or the drive tooth for an additional component that would have to be connected with the torsional vibration damper by means of a connecting means. The driven tooth and/or the drive tooth can be formed as a single piece with the drive disk or with the driven disk. The component that forms the driven tooth and/or the drive tooth features at least a further function relevant to the function of the torsional vibration damper, for example touching the arc spring in order to exert a force on the arc spring, and/or receiving the force from the arc spring. Through the concentration of different functions in one component, the number of components can be reduced and the assembly simplified. Furthermore, the space needed can be reduced in the axial direction.

The invention further relates to a transmission power train of a motor vehicle with a drive shaft on the engine side, particularly a crankshaft, and an ancillary component coupled with the drive shaft via a belt pulley damper, particularly a generator/alternator, whereby the belt pulley damper can be formed or developed as described above. Through the belt pulley damper interposed between the drive shaft or the drive hub and the ancillary component, torsional vibrations can be attenuated, and above the defined threshold values for drive operation, they can differ from those of coasting operation, providing a freewheel effect without noise emission increasing substantially.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
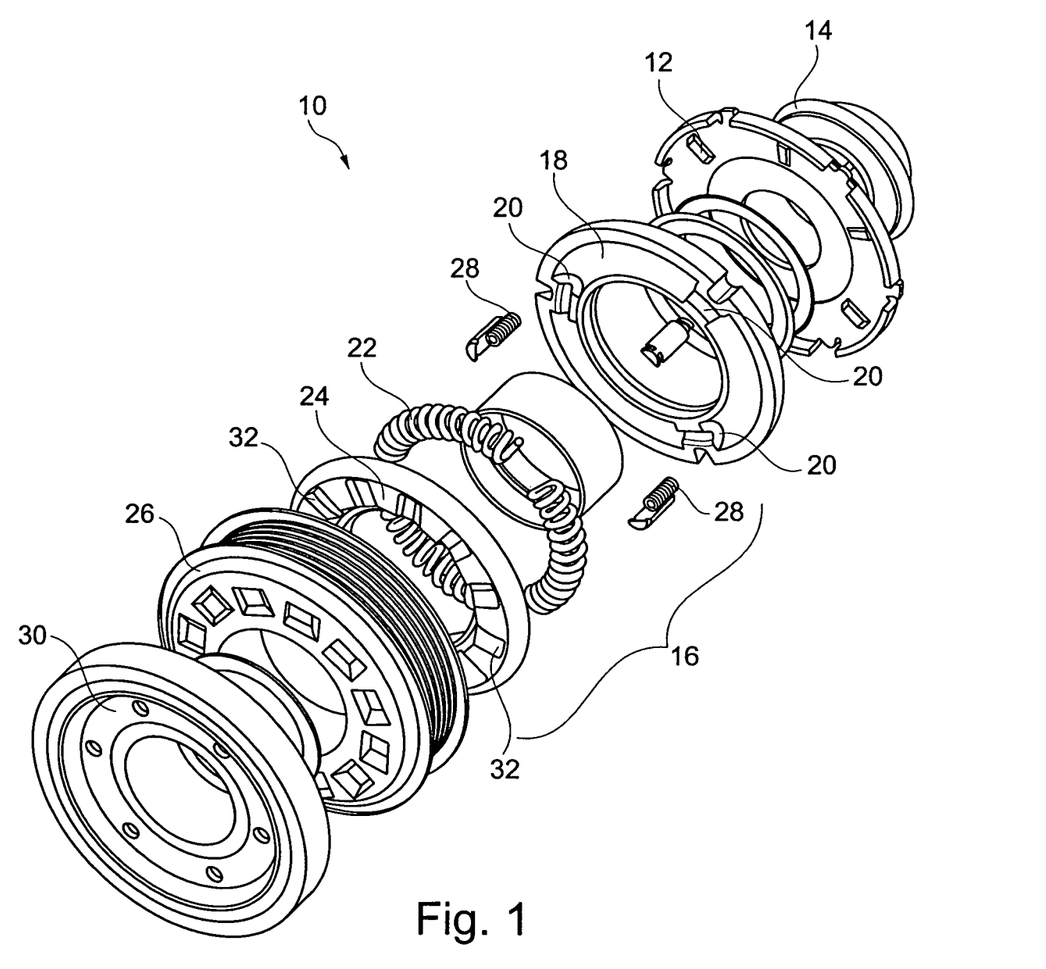
FIG. 1 shows a schematic front perspective exploded view of a belt pulley damper in a first embodiment.
Figure 2:
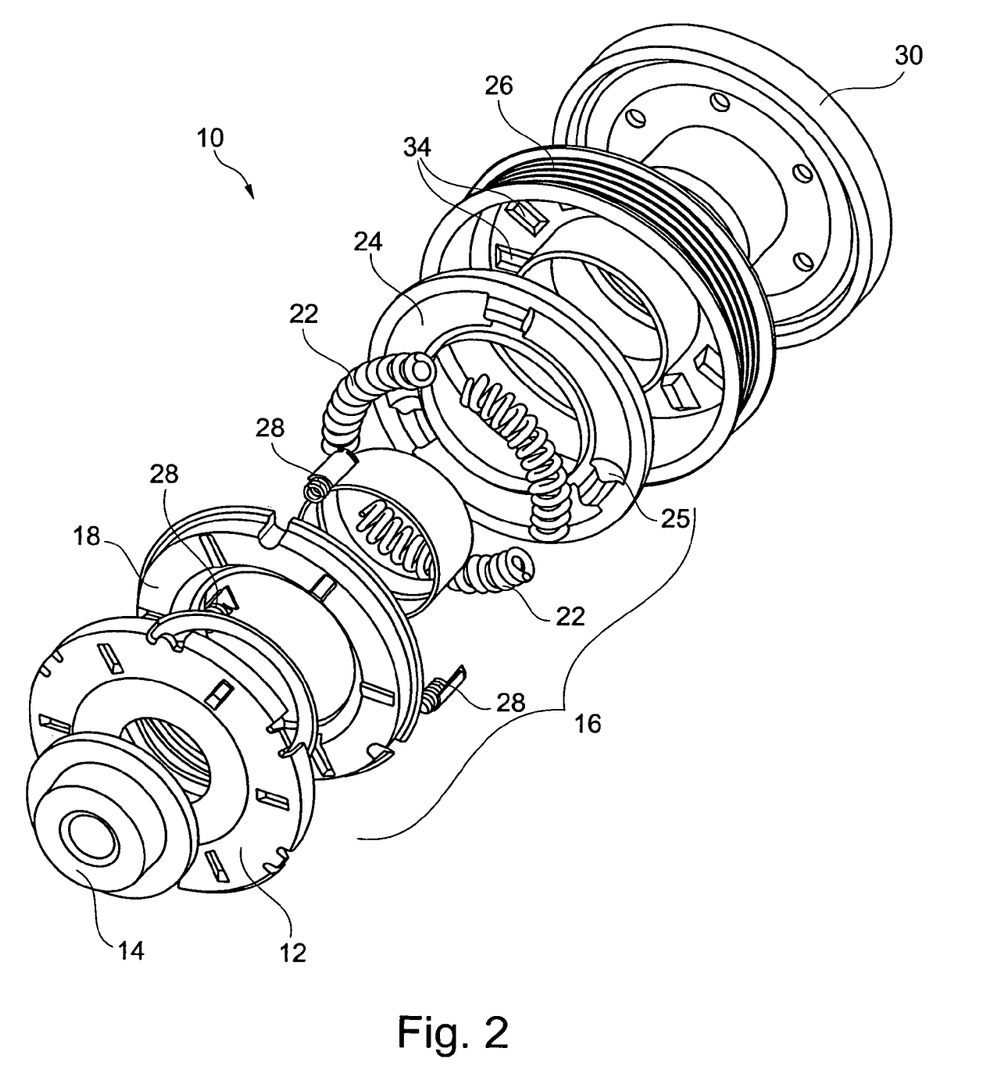
FIG. 2 shows a schematic perspective exploded view of the belt pulley damper of FIG. 1 in a rear side view.

The belt pulley damper 10 shown in FIG. 1 and FIG. 2 includes a drive flange 12 that can be connected with a drive hub 14 of a drive shaft. A torsional vibration damper 16 is connected with the drive flange. The torsional vibration damper 16 is designed as a decoupler for torsional vibrations and is comparable with a dual mass flywheel. The torsional vibration damper 16 includes a drive disk 18 connected directly with the drive flange 12. The drive disk 18 includes drive-side stops 20, between which an arc spring 22 is respectively disposed. A driven disk 24 is coupled with the drive disk 18 via the arc spring 22. The driven disk 24 includes driven-side stops 25 (FIG. 2) that can lie opposite the drive-side stops 20 on the drive disk 18. The driven disk 24 is movable in the circumferential direction, relative to the drive disk 18. Upon occurrence of torsional vibrations, the arc spring 22 can be compressed between the drive disk 18 and the driven disk 24, thus storing energy. The energy stored by the arc spring 22 can be delivered essentially without losses upon expansion of the arc spring 22, whereby the torsional vibrations occurring through the engine combustion of a motor vehicle can be absorbed or damped.

The driven disk 24 of the torsional vibration damper 16 can transmit the torque of the drive hub 14 to a belt pulley 26. The driven disk 24 is axially movable relative to the belt pulley 26, so that according to the position of the driven disk 24, relative to the belt pulley 26, a non-rotatable connection can be formed between the driven disk 24 and the belt pulley 26, or a freewheel effect between the driven disk 24 and the belt pulley 26. By means of a spring element 28 formed as a coil spring, a spring force can be exerted axially on the driven disk 24 in order to press the driven disk 24 against the belt pulley 26. Furthermore, an absorber 30 can be connected with the drive flange 12 that can be designed, for example, as a flywheel disk, in order to be able to absorb the occurring torsional vibrations based on an increased moment of inertia.

Figure 3:
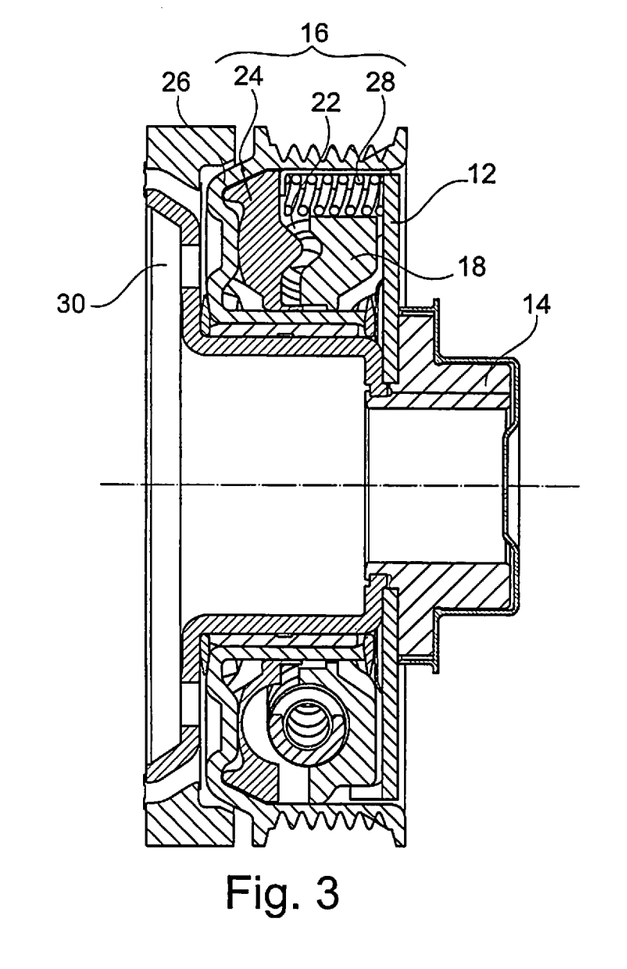
FIG. 3 shows a schematic cross-sectional view of the belt pulley damper of FIG. 1 with a blocked freewheel.
Figure 4:
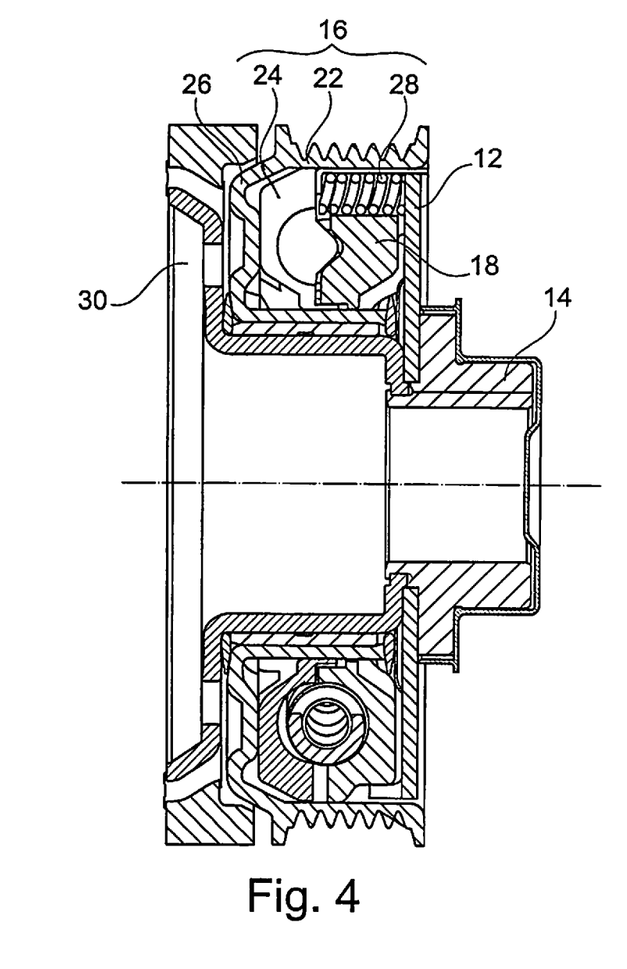
FIG. 4 shows a schematic cross-sectional view of the belt pulley damper of FIG. 1 with an effective freewheel.

In order to be able to transmit torque from the driven disk 24 to the belt pulley 26, the driven disk 24 includes several drive teeth 32 (FIG. 1) distributed in the circumferential direction, which can form a releasable toothed connection of the belt pulley 26 with correspondingly designed belt pulley teeth 34 (FIG. 2). If, as shown in FIG. 3, the driven disk 24, based on the spring force of the coil spring 28, is possibly pressed far away from the drive flange 12, the belt pulley tooth 34 and the drive tooth 32 can lie laterally against one another, so that in the circumferential direction, between the driven disk 24 and the belt pulley 26, a closing force is provided and torque can be transmitted. If, as shown in FIG. 4, the driven disk 24 is moved against the spring force of the coil spring 28 toward the drive flange 12, the belt pulley tooth 34 and the drive tooth 32 are no longer engaged, so that between the driven disk 24 and the belt pulley 26 a freewheel is formed and torque is no longer transmitted between the driven disk and the belt pulley 26.

Figure 5:
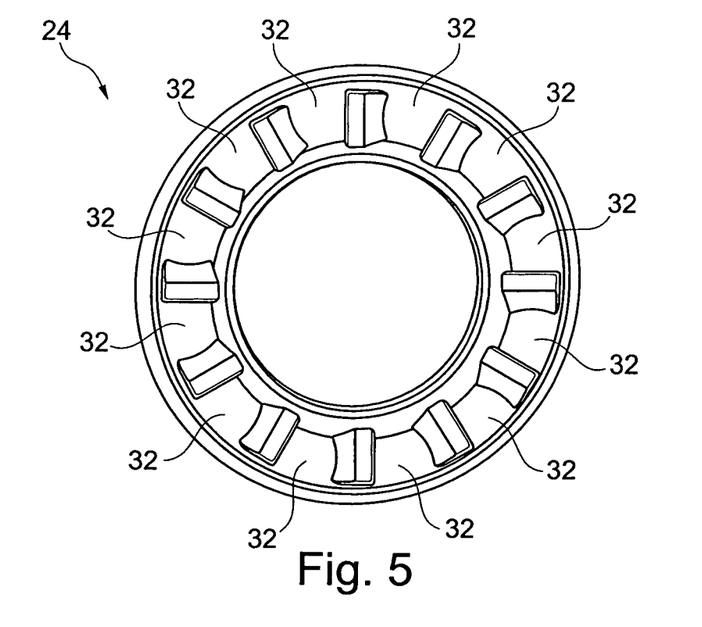
FIG. 5 shows a schematic plan view of a driven disk of the belt pulley damper of FIG. 1.
Figure 6:
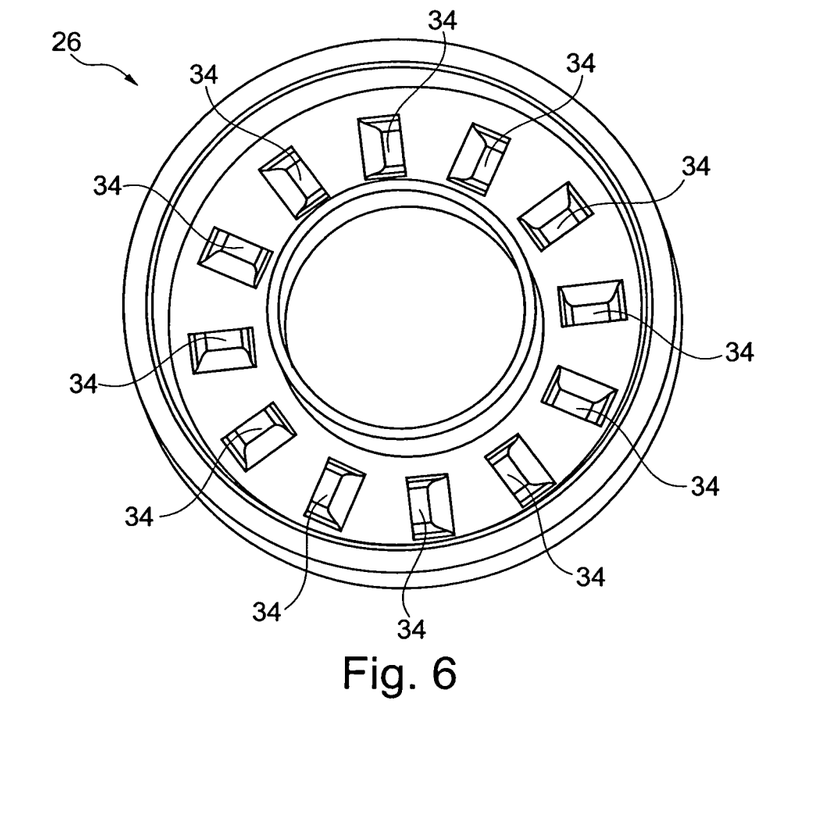
FIG. 6 shows a schematic plan view of a belt pulley of the belt pulley damper of FIG. 1.
Figures 7, 8:
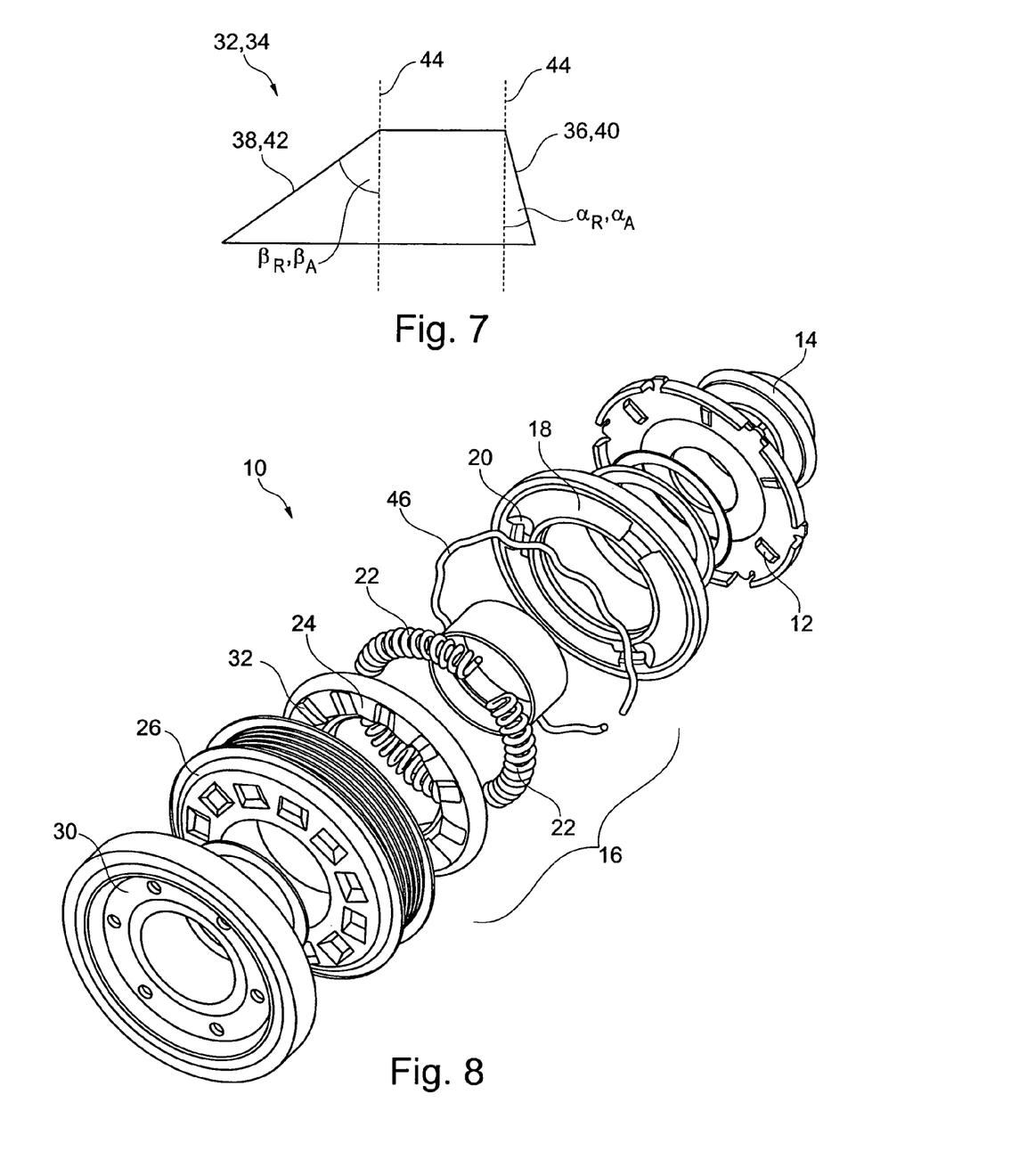
FIG. 7 shows a schematic sectional view of a belt pulley tooth, or of a driven tooth, of the belt pulley damper of FIG. 1.
FIG. 8 shows a schematic front perspective exploded view of a belt pulley damper in a second embodiment.

As shown in FIG. 5 and FIG. 6, the belt pulley teeth 34 and the drive teeth 32 can be curved in the radial direction and provide tooth flanks with a different inclination. As shown in FIG. 7, the belt pulley tooth 34 can include a belt pull flank 36 that is effective during drive operation and a belt push flank 38 that is effective during coasting operation. The drive tooth 32 can correspondingly include a drive pull flank 40 that is effective during drive operation and a driven push flank 42 that is effective during coasting operation. The respective pull flanks 36, 40 can include a belt pull angle $\alpha_R$ to a plane 44 extending along the height of the teeth, or a drive pull angle $\alpha_A$. Accordingly, between the respective push flanks 38, 42 to the plane 44 extending along the tooth height, a belt push angle $\beta_R$ or a drive push angle $\beta_A$ is formed, whereby the respective pull angle $\alpha$ is smaller than the respective push angle $\beta$. Thus, in coasting operation, a free-wheel device can be provided for a correspondingly low threshold push force, whereas in drive operation, a free-wheel device is provided for a correspondingly high threshold pull force.

It is also possible to dispose the freewheel device formed by the belt pulley tooth 34 and the drive tooth 32 in a power-flow direction between the drive shaft, or a drive hub 14 connected with the drive shaft, and the torsional vibration damper 16. The respective teeth 32, 34 of the freewheel device can be formed in this case, for example, by a drive disk 18 of the torsional vibration damper 16 and the drive hub 14, or the drive flange 12, particularly connected with the drive hub 14.

In the embodiment of the belt pulley damper 10 shown in FIG. 8, in comparison with the embodiment of the belt pulley damper 10 shown in FIG. 1, the plurality of coil springs 28 are replaced by an axially resilient ring 46 that is wavy in the axial direction. The resilient ring 46 is disposed coaxially to the torsional vibration damper 16 and includes a correspondingly large nominal diameter.

Figure 9:
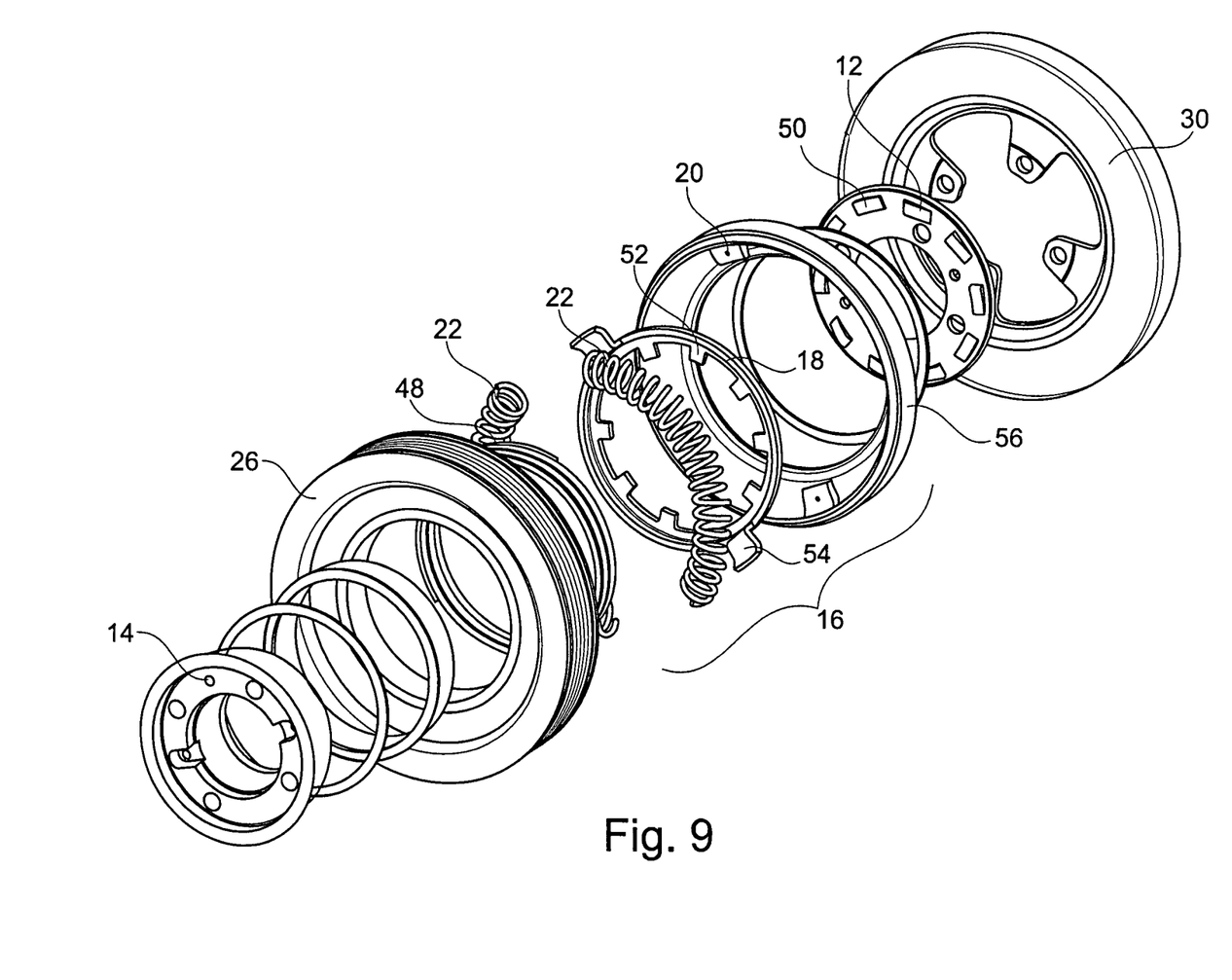
FIG. 9 shows a schematic rear perspective exploded view of a belt pulley damper in a third embodiment.

In the embodiment of the belt pulley damper 10 shown in FIG. 9 in comparison with the embodiment of the belt pulley damper 10 shown in FIG. 8, the resilient ring 46 is replaced by a curved compression spring 48. The compression spring 48 is disposed coaxially to the torsional vibration damper 16 and includes a correspondingly large nominal diameter. Furthermore, in this embodiment the free-wheel function is not formed by the driven disk 24 and the belt pulley 26 but rather by the drive flange 12 and the drive disk 18. The drive flange 12 includes flange teeth 50 that can be engaged with drive teeth 52 of the drive disk 18 in order to transmit torque. In the represented exemplary embodiment, a freewheel device is formed by the flange tooth 50 and the drive tooth 52 that is disposed in the power flow direction between the drive hub 14 and the torsional vibration damper 16. Since the drive disk 18 is movable in axial direction against a spring force exerted by the compression spring 48 on the drive flange 12, the drive tooth 52 can slide off the flange tooth 50 upon a correspondingly high threshold force. Through this, the drive disk 18 is axially shifted so that the flange tooth 50, and the drive tooth 52, are no longer engaged, and form a free-wheel device. The flange tooth 50 and the drive tooth 52 can be designed as shown in FIG. 7. In the shown embodiment, the drive side of the torsional vibration damper is split so that the drive disk 18 engages with the help of radially outward extensions 54 into a drive-side cover 56, whereby the cover 56 forms the drive-side stops 20 on the arc spring 22.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A belt pulley damper for attenuating torsional vibrations of a drive shaft of a motor vehicle engine, said damper comprising:
a belt pulley for driving a pulling device,
a drive flange spaced axially from an inner radial surface of the belt pulley and nonrotatably connected with the drive shaft,
a torsional vibration damper connected with the drive flange for damping torsional vibrations introduced from the drive shaft, wherein the torsional vibration damper includes a drive disk axially movable relative to the drive flange, and a driven disk axially adjacent to and axially movable relative to the belt pulley,
wherein the belt pulley includes at least one belt pulley tooth on the inner radial surface and axially facing the driven disk, and the driven disk includes at least one driven disk tooth axially facing the inner radial surface of the belt pulley, wherein the at least one belt pulley tooth and the at least one driven disk tooth are engaged below a threshold pull force acting on the belt pulley and occurring during drive operation of the drive shaft during which operation power flows from the drive shaft to the belt pulley, and are disengaged above the threshold pull force during drive operation of the drive shaft, and wherein the belt pulley tooth and the driven disk tooth are engaged below a threshold push force acting on the belt pulley and occurring during coasting operation during which no torque is transmitted by the drive shaft to the belt pulley and power flows from the belt pulley toward the drive shaft, and are disengaged above the threshold push force during coasting operation.

2. A belt pulley damper according to claim 1, wherein an axial spring force is applied to the driven disk by an axially-acting spring means for urging the driven disk axially toward the belt pulley.

3. A belt pulley damper according to claim 2, wherein the drive disk is nonrotatably connected with the drive flange, and wherein the axially-acting spring means is supported on the drive disk.

4. A belt pulley damper according to claim 2, wherein the spring means includes a plurality of axially-acting springs that are circumferentially distributed between the drive disk and the driven disk.

5. A belt pulley damper according to claim 2, wherein the spring means includes a ring having an axially resilient wavy form.

6. A belt pulley damper according to claim 1, wherein the belt pulley tooth includes a belt pull flank that is effective during drive operation, and a belt pulley tooth push flank that is effective during coasting operation, wherein the belt pulley tooth pull flank has a belt pulley tooth pull flank angle $\alpha_R$ relative to a radial plane extending along a belt pulley tooth height, and the belt pulley tooth push flank has a belt pulley tooth push flank angle $\beta_R$ relative to a radial plane extending along a belt pulley tooth height, wherein the belt pulley tooth pull flank angle $\alpha_R$ is smaller than the belt pulley tooth push flank angle $\beta_R$, and the driven disk tooth includes a driven disk tooth pull flank angle that is operative during drive operation and a driven disk tooth push flank angle that is operative during coasting operation, wherein the driven disk tooth pull flank includes a driven disk tooth pull flank angle $\alpha_A$ relative to a plane extending along a driven disk tooth height and the driven disk tooth push flank includes a driven disk tooth push flank angle $\beta_A$ relative to a plane extending along the driven disk tooth height, wherein the driven disk tooth pull flank angle $\alpha_A$ is smaller than the driven disk tooth push flank angle $\beta_A$.

7. A belt pulley damper according to claim 6 wherein the belt pull flank $\alpha_R$ angle is $0°<\alpha_R\leq30°$, the driven disk tooth pull flank angle $\alpha_A$ is $0°<\alpha_A\leq30°$, the belt pulley tooth push flank angle $\beta_R$ is $65°\leq\beta_R<90°$, and the driven disk tooth push flank angle $\beta_A$ is $65°\leq\beta_A<90°$.

8. A belt pulley damper according to claim 6, wherein the belt pulley tooth pull flank and the belt pulley tooth push flank, and the driven disk tooth pull flank and the driven disk tooth push flank are each inclined relative to the radial direction of the belt pulley damper.

9. A belt pulley damper according to claim 1, wherein the belt pulley tooth has a softer outer material cover in comparison with an inner material hardness under the outer material cover, and located on an outer side of the belt pulley tooth that faces the driven disk, and the driven disk tooth has a softer outer material cover in comparison with an inner material hardness under its outer material cover and on an outer side of the driven disk tooth facing the belt pulley.

10. A belt pulley damper according to claim 1, wherein the drive flange includes at least one drive-flange-mounted tooth extending axially toward the drive disk, and the drive disk includes at least one drive-disk-mounted tooth extending axially toward the drive flange, wherein the at least one drive flange tooth and the at least one drive disk tooth are formed such that both the drive flange tooth and the drive disk tooth are engaged below a threshold pull force acting on the belt pulley and occurring during drive operation and are disengaged above the threshold pull force during drive operation, and the drive flange tooth and the drive disk tooth are engaged below a threshold push force acting on the belt pulley and occurring during coasting operation and are disengaged above the threshold push force during coasting operation.

11. A belt pulley damper according to claim 10, wherein the drive driven disk tooth is integrally formed with the driven disk of the torsional vibration damper.

12. A belt pulley damper according to claim 1, wherein the driven disk tooth is integrally formed with the driven disk of the torsional vibration damper.

\* \* \* \* \*